Figure 1:
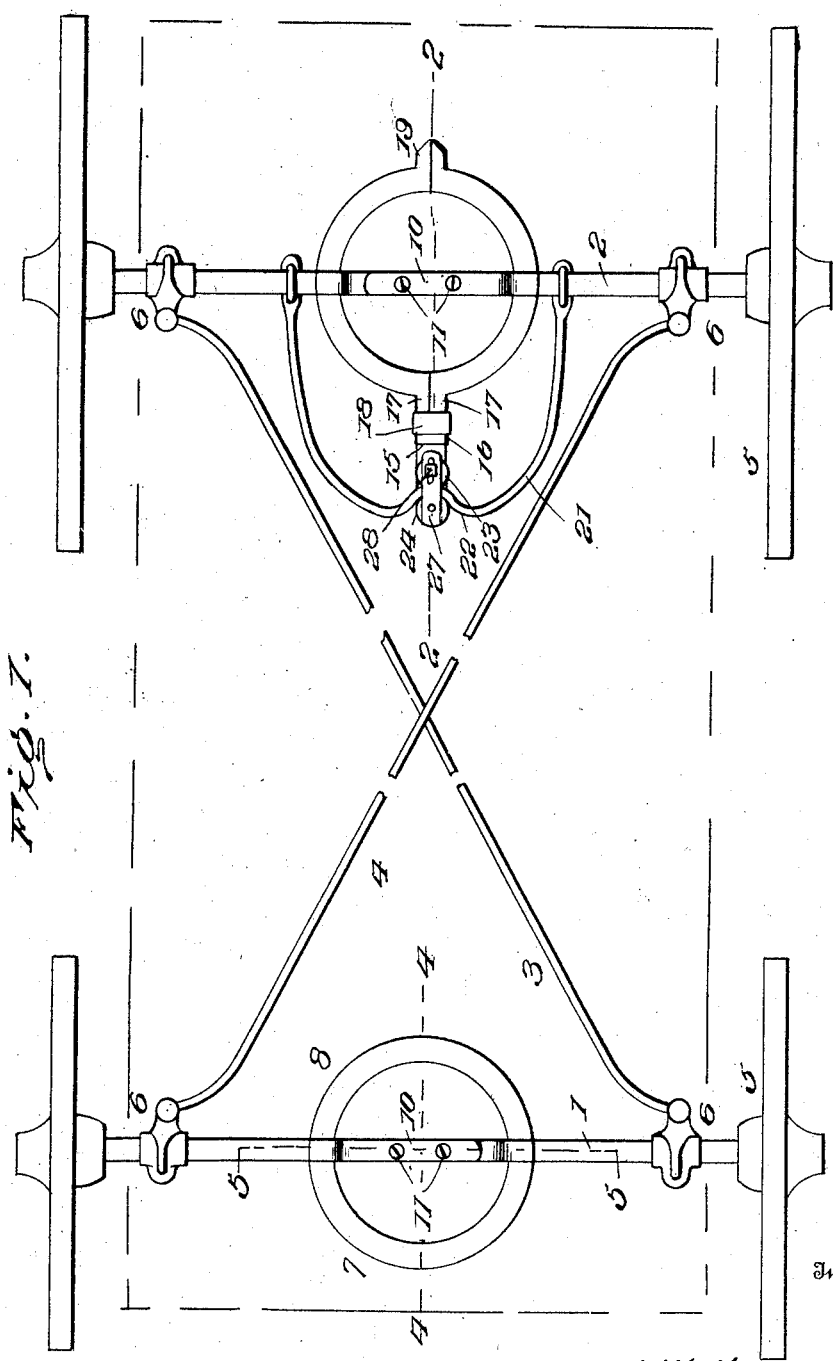

No. 882,826. PATENTED MAR. 24, 1908.
M. W. HEYENGA.
RUNNING GEAR.
APPLICATION FILED FEB. 1, 1907.

3 SHEETS—SHEET 1.

Witnesses

Inventor
M. W. Heyenga
By
R. S. & A. B. Lacey
Attorneys

No. 882,826. PATENTED MAR. 24, 1908.
M. W. HEYENGA.
RUNNING GEAR.
APPLICATION FILED FEB. 1, 1907.
3 SHEETS—SHEET 2.
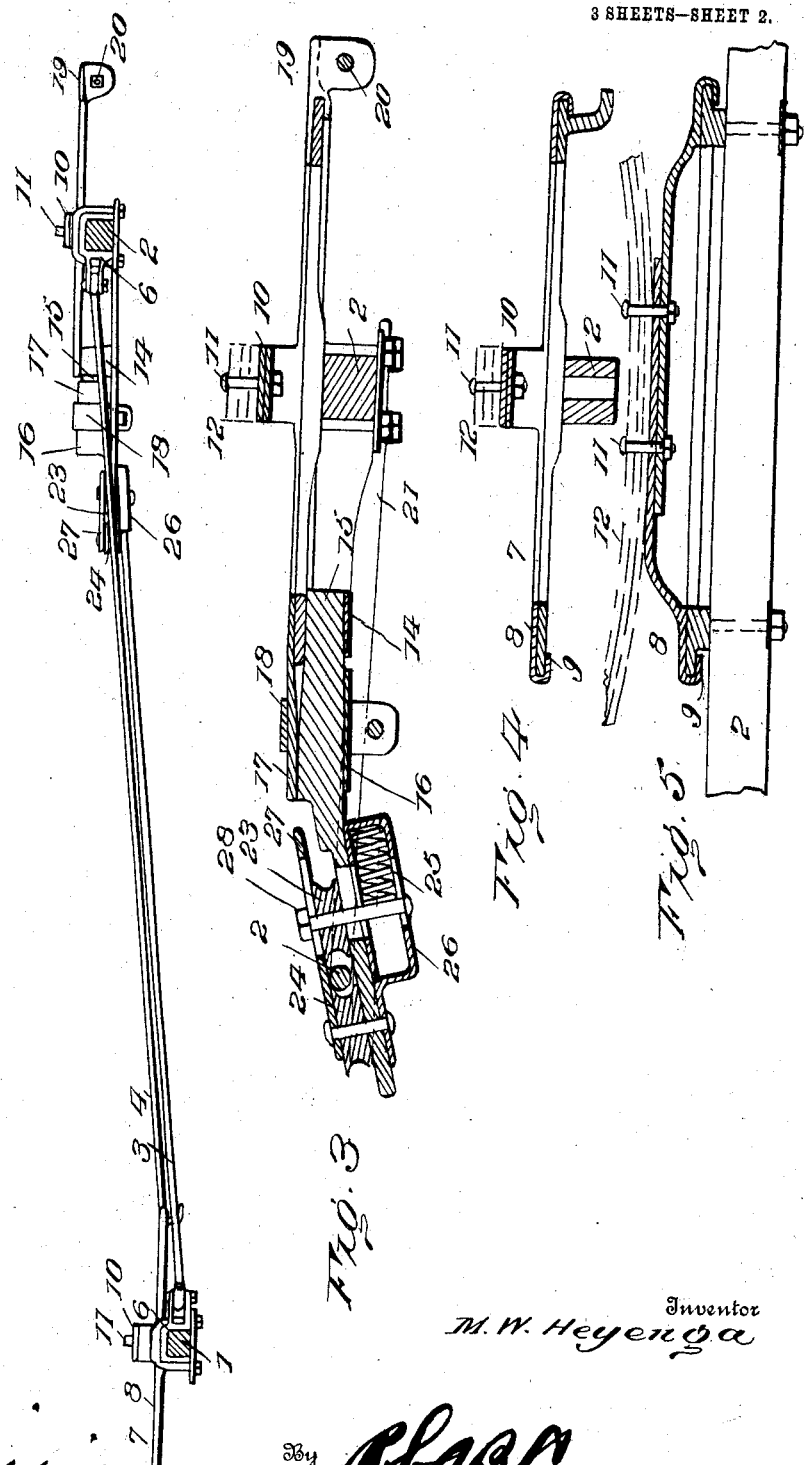
Inventor
M. W. Heyenga
Witnesses
By
Attorneys No. 882,826. PATENTED MAR. 24, 1908.
M. W. HEYENGA.
RUNNING GEAR.
APPLICATION FILED FEB. 1, 1907.
3 SHEETS—SHEET 3.
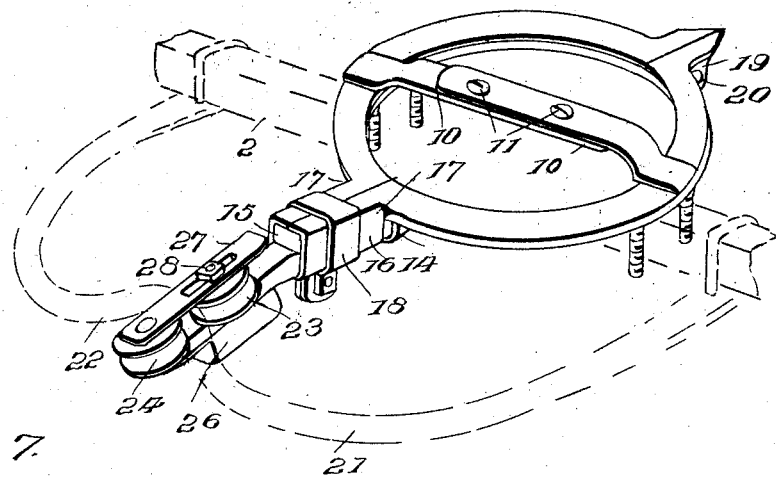
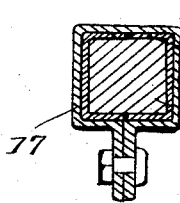
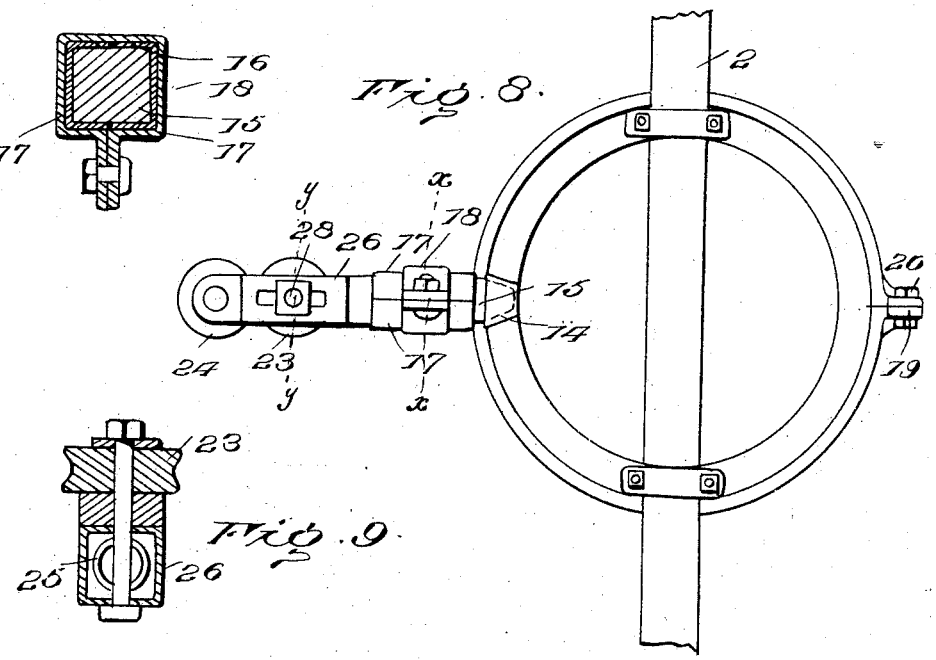
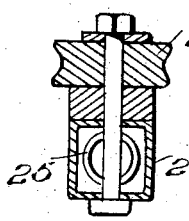
Witnesses
Inventor
M. W. Heyenga
By R. S. & A. B. Lacey
Attorneys

UNITED STATES PATENT OFFICE.

MARTIN W. HEYENGA, OF CHICAGO, ILLINOIS.

RUNNING-GEAR.

No. 882,826.　　　　Specification of Letters Patent.　　Patented March 24, 1908.

Application filed February 1, 1907. Serial No. 355,332.

*To all whom it may concern:*

Be it known that I, MARTIN W. HEYENGA, citizen of the United States, residing at Chicago, in the county of Cook and State of Illinois, have invented certain new and useful Improvements in Running-Gears, of which the following is a specification.

This invention relates to vehicle running gear of the variety admitting of both the front and the rear axles turning with the result that the vehicle is enabled to turn in a comparatively small space. In this type of running gear, the axles, and particularly the rear axles, have free movement which is objectionable on straight or direct roads and produces unnecessary friction and wear.

The present invention provides locking means for the rear axle to secure the same from movement when the vehicle is moving in a direct, or straight line, and which locking means is adapted to be released by movement of the front axle only as when turning the same to depart from a direct course.

The invention provides novel connecting means between the crossed rods, or bars, coupling the front and rear axles; to provide a fifth wheel connection of unique structure between the axles and the springs or intermediate devices between the vehicle body and the axles, and to devise locking means of peculiar formation for securing the rear axle and adapted to be released upon turning of the front axle when departing from a straight course.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a vehicle running gear embodying the invention. Fig. 2 is a side view, the wheels being removed and the axles in section. Fig. 3 is a longitudinal section on the line 2—2 of Fig. 1, showing the parts on a larger scale. Fig. 4 is a section on the line 4—4 of Fig. 1 showing the parts on a larger scale. Fig. 5 is a longitudinal section on the line 5—5 of Fig. 1, showing the axle in full lines. Fig. 6 is a detail perspective view of the fifth wheel applied to the rear axle and the lock means for the members thereof. Fig. 7 is a detail view on the line $x$—$x$ of Fig. 8. Fig. 8 is a bottom plan view of the rear fifth wheel and the lock for the members thereof. Fig. 9 is a section on the line $y$—$y$ of Fig. 8.

The running gear comprises front axle 1, rear axle 2, connecting rods or bars 3 and 4, front and rear fifth wheels and coöperating parts, a lock mechanism for the rear axle and supporting wheels 5 fitted to the spindle or arms of both axles. The connecting rods 3 and 4 cross each other at a point intermediate of the front and rear axles, and to avoid interference of one with the other, said rods are arranged in different horizontal planes. In order that the rods may extend beneath the body of the vehicle as far as possible to avoid the steps pendent therefrom, or other projecting parts, the end portions of said rods 3 and 4 are curved outward. The outwardly curved ends of the connecting rods terminate in eyes through which pass the pivot fastenings connecting them with the clips 6 secured to the end portions of the respective axles. Each clip 6 is provided with spaced lugs projected horizontally from the inner leg and between which lugs the ends of the connecting rods are received and pivoted. The lugs of one clip at one end of the axle are in a higher plane than the lugs of the clip at the opposite end of the same axle and the lugs of the clips applied to the other axle are reversely arranged, thereby admitting of one connecting rod being in a higher plane than the other connecting rod to avoid interference between the rods when steering the vehicle either to the right or to the left. A fifth wheel is clipped, or otherwise secured to each axle and consists of a ring, or circular member 7, fast to the axle and a sectional ring, or member adapted to be secured to the vehicle body. The upper ring, or circular member of each fifth wheel is composed of semi-circular sections 8 having recurved flanges 9 at their outer edges to embrace the outer edge of the ring, or circular member 7, so as to hold the two members of the fifth wheel together. An arm 10 projects inward from each semi-circular section 8 and is offset near its juncture with a section to throw the arm in a higher plane than the fifth wheel so that the vehicle spring, bolster, or like part when secured to the overlapped arms 10 will occupy a position above the fifth wheel to prevent possible interference therewith. The inner ends of the arms 10 of complemental sections 8 overlap and are secured by suitable fastenings 11. The overlapping of the arms 10 also results in a mutual strengthening or bracing thereof at a central point which is subjected to the greatest strain. When the fastenings 11 are removed the sections 8 may readily be placed in position, or removed from the lower member 7 of the fifth wheel, and when said sections 8 are properly assembled and connected by the fastenings 11, they are secured to the member 7 by the recurved flanges 9. The vehicle spring 12, or like part is clipped, or otherwise firmly secured to the overlapped ends of the arms 10 and is connected to the vehicle body 13 in any substantial way to prevent relative movement.

A keeper 14 is provided upon the lower side of the forward portion of the ring, or circular member 7 of the rear fifth wheel and coöperates with a lock bolt 15 carried by the upper member of said fifth wheel to prevent relative movement of the two members under known conditions, as when the vehicle is moving in a direct course. The lock bolt is slidable in a box 16 projected forward from the upper member of the fifth wheel, said box consisting of similar sections 17 projected outward from corresponding ends of the parts 8 of the upper member of the said rear fifth wheel. A clamp 18 encircles the box sections 17 and holds them together. The rear end of the lock bolt is made tapered and the front end of the keeper 14 is flared as clearly indicated in Fig. 8, this construction being necessary in order to provide for a simultaneous movement of the lock bolt and rear axle as in the initial movement of the lock bolt, or the final movement when entering the keeper 14. Ears 19 project rearward from the sections 8 and are transversely pierced to receive a bolt or fastening 20 by means of which said ears and the rear ends of the sections 8 are connected after the parts of the upper member of the rear fifth wheel have been placed in position.

From the foregoing it will be readily comprehended that the lower member of the rear fifth wheel is secured to the rear axle and the upper member connected with the body of the vehicle; hence there is no relative movement between the upper member of the fifth wheel and the vehicle body and the lower member of the fifth and the rear axle. Under ordinary conditions, as when passing over a road having ruts, or an uneven surface, both axles tend to oscillate, the result being that considerable wear and friction is occasioned to no purpose. To prevent relative movement of the rear axle when the vehicle is moving in a direct course, the lock bolt 15 carried by the upper member of the fifth wheel engages with the keeper 14 of the lower member of said fifth wheel. To release the members of the rear fifth wheel when turning the front axle, the following means have been devised, the same consisting of a rod or bar 21 of approximately semi-circular form, clipped or otherwise secured to the rear axle, and having a cam portion 22 which coöperates with a projecting part of the lock bolt to effect withdrawal thereof upon turning the rear axle either to the right or to the left by movement imparted thereto from the front axle through the connecting rods 3 and 4. The cam portion 22 is located forward of the rod 21 and consists of a crimp or indentation formed in the central portion of the rod. Rollers 23 and 24 are mounted upon pins, or other supports projected from the lock bolt 15 and embrace opposite sides of the rod 21. One of the rollers, as 24, is fixed, whereas the other roller 23 is movable towards and from the fixed roller, being pressed forward by means of a spring 25 inclosed in a housing 26 applied to, or forming a part of, the lock bolt 15. A plate 27 overlaps the rollers 23 and 24 and receives the upper ends of the pins, or supports, upon which said rollers are mounted. The pin 28 for the rear roller 23 operates in slots formed in the lock bolt 15 and plate 27 and its lower end extends into the housing 26 to receive the end thrust of the spring 25 by means of which the roller 23 is pressed against the inner side of the rod 21, thereby preventing any lost motion and admitting of the rollers accommodating themselves to any inequalities in the rod 21, or otherwise binding of the parts which would be liable to occur if both rollers 23 and 24 were mounted upon fixed supports.

When a vehicle embodying the invention is moving in a direct course, the rear axle is held rigid by the lock means between the members of the rear fifth wheel, but when the front axle is turned to divert the vehicle from a direct course, a corresponding turning movement is positively imparted to the rear axle through the connecting rods 3 and 4, thereby causing the rod 21 to correspondingly move and effect release of the locking means through the action of the cam 22 in the manner stated. When the axles again assume a parallel arrangement, the lock bolt 15 is shot into the keeper 14 and secures the members of the fifth wheel and holds the rear axle rigid until positive turning movement is again imparted to the rear axle by a turning of the front axle when the cam 22 will engage with the forward roller 24 and withdraw the lock bolt from the keeper and permit the rear axle to turn as will be readily understood.

Particular attention is directed to the fact that the keeper 14 has the sides thereof flared forwardly as indicated in Fig. 8 while the rear end of the locking bolt 15 is tapered, such construction effectively locking the rear axle against turning due to jolting, but permitting of a simultaneous sliding movement of the bolt and a turning of the rear axle in the initial movement of the rear axle when the front axle is turned to change the direction of the vehicle.

Having thus described the invention, what is claimed as new is:

1. In vehicle running gear, the combination of a fifth wheel connection between an axle and a vehicle body, the same comprising complemental members, a slidable locking bolt carried by one of the complemental members and designed to engage the opposite complemental member, a member applied to the axle and formed with a cam, and an operative connection between the cam and the locking bolt.

2. In vehicle running gear, the combination of a fifth wheel connection between an axle and a vehicle body, the same comprising complemental members, a flared keeper carried by one of the complemental members, a slidable locking bolt mounted upon the opposite complemental member and provided with a beveled end designed to engage the before mentioned flared keeper, a member applied to the axle and formed with a cam, and an operative connection between the cam and the locking bolt.

3. In vehicle running gear, the combination of a fifth wheel connection between an axle and a vehicle body, the same comprising a lower ring applied to the axle and an upper ring carried by the vehicle body and engaging the lower ring, an extension projecting from the upper ring, a keeper carried by the lower ring, a locking bolt mounted upon the before mentioned extension and adapted to engage the keeper, and means for automatically releasing the locking bolt from engagement with the keeper.

4. In vehicle running gear, the combination of a fifth wheel connection between the rear axle and the vehicle body, the same comprising complemental members, a flared keeper carried by one of the complemental members, a slidable locking bolt mounted upon the opposite complemental member and formed with a beveled end for engaging the flared keeper, a member applied to the rear axle and formed with a cam, means for causing the cam to release the locking bolt from engagement with the keeper when the rear axle is turned, a front axle, and an operative connection between the front axle and the rear axle.

5. In vehicle running gear, the combination of a fifth wheel between an axle and the vehicle body, the same comprising complemental members, one member being of circular form and the other member consisting of sections, each having a recurved flange to embrace an edge portion of the first mentioned member, and also provided with an inwardly extended arm, the said arms of the two sections being connected and serving the double function of holding the sections together and of forming a means for connecting them to the vehicle body.

6. In vehicle running gear, the combination of a fifth wheel between an axle and the vehicle body, the same comprising complemental members, one member being of circular form and the other member consisting of sections, each having a recurved flange to embrace an edge portion of the first mentioned member, and arms extended inward from said sections and adapted to be connected to secure the sections when properly assembled, said arms having an off-set near their outer ends to throw their inner ends to a higher plane than the fifth wheel.

7. In vehicle running gear, the combination of a fifth wheel connection between an axle and the vehicle body, the same comprising complemental members, one being of circular formation and the other member consisting of sections each having a recurved flanged portion to embrace an edge of the first mentioned member and each of said sections having projecting terminal portions adapted to be secured, and an arm projected inward from each section at an intermediate point, said arms being off-set and having their inner ends overlapped and adapted to be secured.

8. In vehicle running gear, the combination of a fifth wheel comprising complemental members, a lock bolt carried by one of said members and adapted to interlock with the other member, a cam, and rollers connected with the lock bolt and embracing opposite sides of said cam to effect positive movement of the lock in each direction.

9. In vehicle running gear, the combination of a fifth wheel comprising complemental members, a lock bolt carried by one of said members and adapted to interlock with the other member, a cam, and rollers connected with the lock bolt and embracing opposite sides of said cam to effect positive movement of the lock bolt in each direction, one of said rollers being mounted upon a movable support, and a spring normally exerting a pressure upon said support to hold the roller mounted thereon in yielding engagement with the said cam.

10. In vehicle running gear, the combination of an axle, a fifth wheel comprising complemental members, one of which is secured to said axle, a lock bolt slidably mounted upon the other member of the fifth wheel and adapted to make interlocking connection with the fifth wheel member attached to said axle, a rod connected to the axle and having a cam portion, a pair of rollers mounted upon the lock bolt and embracing opposite sides of said rod, one of said rollers being mounted upon a fixed support, a movable support for the other roller, a spring normally exerting a pressure upon said movable support, and means for imparting movement to said rod to effect release of the lock bolt when it is required to turn the axle for properly steering the vehicle.

11. In vehicle running gear, the combination of a fifth wheel connection between an axle and the vehicle body, the same comprising complemental members, a slidable locking bolt carried by one of the complemental members and designed to engage the opposite complemental member, means for turning the axle, and means actuated by the axle for automatically withdrawing the locking bolt to permit turning of the same.

12. In vehicle running gear, the combination of a fifth wheel connection between an axle and a vehicle body, the same comprising complemental members, a locking bolt carried by one of the complemental members and designed to engage the opposite complemental member, means for turning the axle, and a cam carried by the axle for automatically withdrawing the bolt to permit turning of the axle.

In testimony whereof I affix my signature in presence of two witnesses.

MARTIN W. HEYENGA. [L. S.]

Witnesses:
 WM. D. SCHULTZ,
 WILLIAM RAMPBEL.